United States Patent
Claas

[15] 3,695,361
[45] Oct. 3, 1972

[54] ROTARY PLOW
[72] Inventor: August Claas, Harsewinkel, Germany
[73] Assignee: Raussendorf & Co. G.m.b.H. Maschinenfabrik, Harz, Germany
[22] Filed: Jan. 15, 1970
[21] Appl. No.: 2,996

[30] Foreign Application Priority Data
Jan. 27, 1969 Germany.........G 69 02 964.7

[52] U.S. Cl. .....................172/67, 172/765, 172/111
[51] Int. Cl. .........................................A01b 9/00
[58] Field of Search......172/67, 35, 59, 63, 522, 523, 172/540, 549, 550, 554, 66, 604, 111, 722, 724, 730

[56] References Cited
UNITED STATES PATENTS

| | | | |
|---|---|---|---|
| 1,729,969 | 10/1929 | Shields | 172/66 X |
| 2,888,084 | 5/1959 | Trecker | 172/41 |
| 3,207,230 | 9/1965 | Raussendorf | 172/67 |
| 2,359,711 | 10/1944 | Eastman | 172/67 |
| 3,448,813 | 6/1969 | Rogers | 172/669 X |
| 1,004,238 | 9/1911 | Brooks | 172/765 X |
| 2,491,892 | 12/1949 | Claus | 172/549 |
| 422,718 | 3/1890 | Cameron | 172/730 |
| 1,693,895 | 12/1928 | Hall | 172/67 |
| 1,697,677 | 1/1929 | Davidson | 172/67 X |
| 1,697,678 | 1/1929 | Davidson | 172/67 |
| 1,697,665 | 1/1929 | Shields | 172/67 |

FOREIGN PATENTS OR APPLICATIONS

| | | | |
|---|---|---|---|
| 24,552 | 4/1961 | Germany | 172/67 |

Primary Examiner—Robert E. Pulfrey
Assistant Examiner—R. T. Rader
Attorney—Karl F. Ross

[57] ABSTRACT

A rotary plow comprises a forwardly directed plowshare and a rotor adapted to ride behind the plowshare in the furrow formed thereby. This rotor consists of a large-diameter upper ring and a small-diameter lower disk with a plurality of tool-carrying struts extending therebetween, thus forming a downwardly converging body of revolution. Mounted on the lower disk are a plurality of angularly spaced outwardly extending blades having leading cutting edges. Each blade rises rearwardly from the cutting edge and has on its inner and outer edges downwardly extending flanges, the inner flange being formed with a lip releasably bolted to the disk.

1 Claim, 4 Drawing Figures

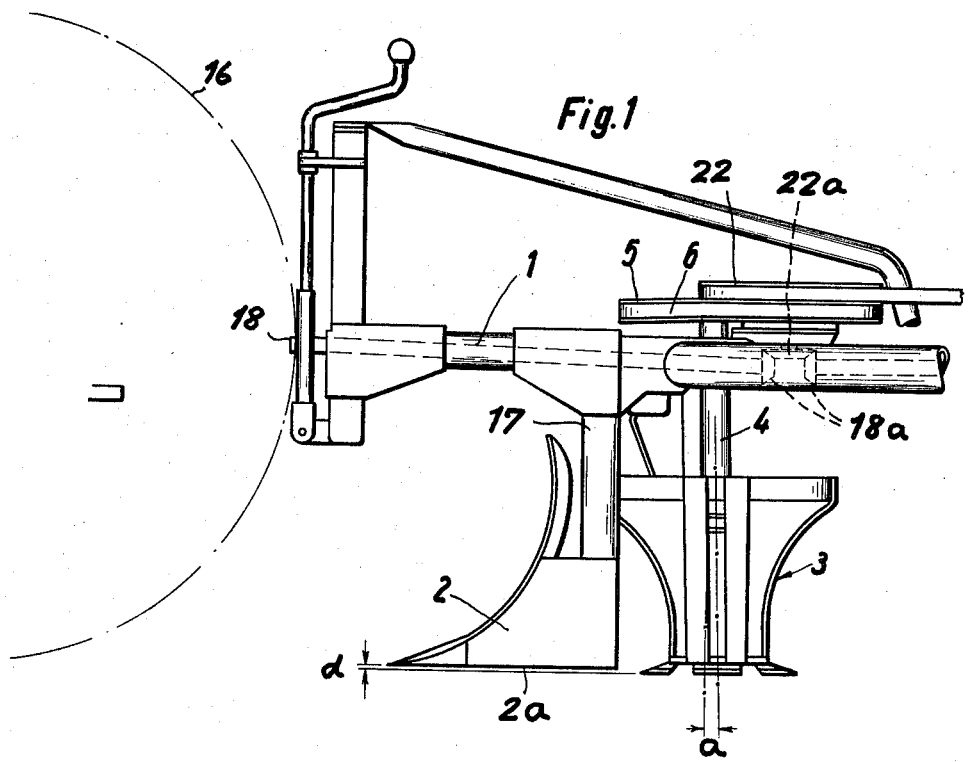
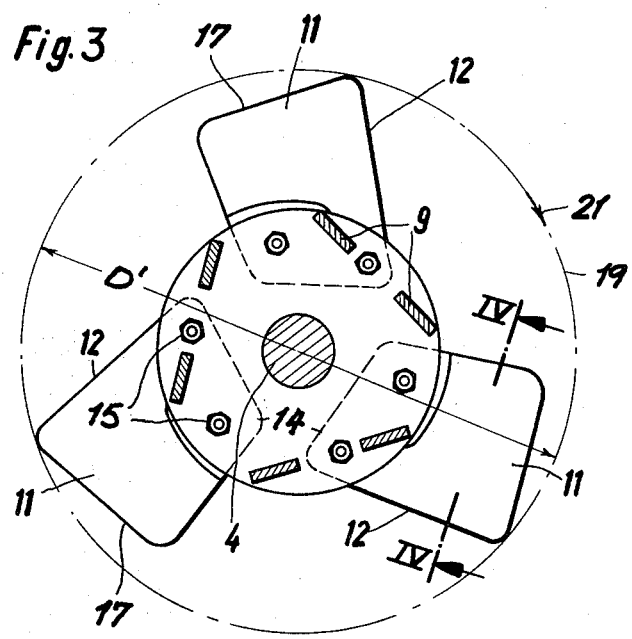

ROTARY PLOW

FIELD OF THE INVENTION

The present invention relates to an agricultural implement and, more particularly, to a rotary plow.

BACKGROUND OF THE INVENTION

A rotary plow is a farm implement having a narrow plowshare which forms a furrow in the ground. A rotor having the shape of a body of revolution, usually a truncated cone, and a plurality of radially extending tools follows the plowshare in the furrow and, as it is rotated, turns the soil and breaks up clumps of earth raised by the share. This rotor has a continuous cutting member at its base which is generally circular and dished so that its outer edge serves to cut under the loosened soil in the furrow. Such a device is described in the commonly assigned U.S. Pat. No. 3,207,230 issued 21 Sept. 1965 to Hans Raussendorf and entitled "PLOW WITH ROTARY SOIL-WORKING IMPLEMENT."

Several difficulties have been encountered with such plows. A significant disadvantage is that the disk-shaped cutting member must slice through the soil, an operation which takes a great deal of energy and results, because of the constant contact between soil and disk, in heavy wear of this member. Another problem is that, also as a result of this constant rubbing, the disk tends to become very hot and weaken. Furthermore, once the cutting member is partially or fully worn out, it is very difficult to replace.

OBJECTS OF THE INVENTION

It is, therefore, an object of the present invention to provide an improved rotary plow.

A more specific object is to provide a rotary plow of the above-described type which overcomes the above-cited disadvantages.

SUMMARY OF THE INVENTION

These objects are attained by a rotary plow having a cutting member constituted by a plurality of radially extending angularly spaced blades each having, in the direction of rotation, a leading cutting edge. These blades chop through the soil and do not engage in constant abrasion thereagainst so that the amount of energy required to drive the rotor is substantially diminished. At the same time, the amount of wear and build-up of heat is reduced.

In accordance with another feature of the invention, the rotor has downwardly converging sides which are fitted with the soil-turning and soil-comminuting tools, the blades of the rotor extending radially beyond the lower portion of these sides to undercut the soil.

According to another feature, each blade lies in a plane inclined to the horizontal, with its cutting edge defining its lowest portion. Furthermore, each blade is of generally U-shaped profile and is formed with a pair of axially downwardly extending flanges; the inner of which is formed in turn with an inwardly extending radial lip that is secured to the base of the rotor. These flanges serve to reinforce the blades, and the upward rearward tilt of each blade tosses the earth upwardly into the path of the soil-turning plates.

DESCRIPTION OF THE DRAWING

The above and other objects, features, and advantages will be come apparent from the following description, reference being made to the accompanying drawing, in which:

FIG. 1 is a largely schematic side view of the plow according to the present invention;

FIG. 3 is a section taken on line III—III of FIG. 2; and

SPECIFIC DESCRIPTION

Figure 2:
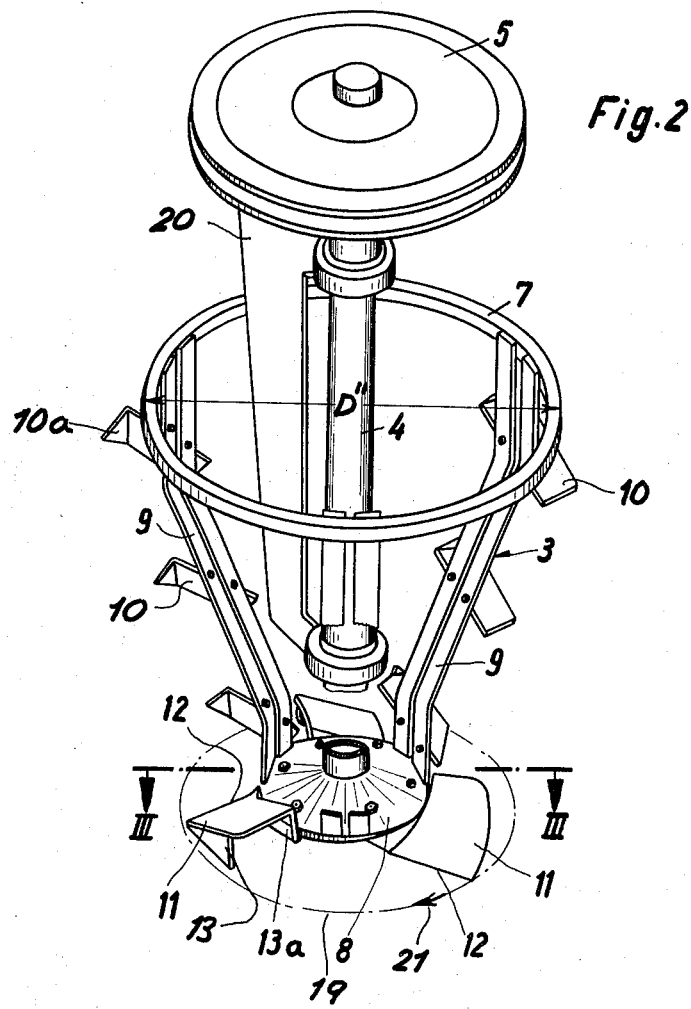
FIG. 2 is an exploded perspective view of the rotor of the plow according to the present invention.

As shown in FIG. 1, a rotary plow comprises a plow beam 1 adapted to be mounted on and towed behind a tractor shown schematically at 16. Depending from this beam 1 is a post 2 carrying a forwardly directed plowshare 2 having an under edge 2a. Behind this plowshare 2 is a depending post 4 on which is mounted a rotor 3 which will be described below. A power shaft 18 is connected to the tractor power takeoff and mounts at one end a bevel gear 18a meshing with a bevel gear 22a connected to a pulley 22. A V-belt 6 couples this pulley 22 to a pulley 5 keyed to the top of the shaft 4 journaled in the beam 1. Several such rotary plow assemblies are mounted on a single beam 1.

Figure 4:
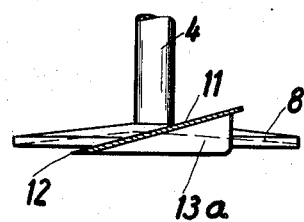
FIG. 4 is a partly sectional view taken on line IV—IV of FIG. 3.

FIGS. 2, 3, and 4 show the detailed structure of the rotor 3. An upper ring 7 is connected to a lower dished plate 8 by three pairs of inwardly downwardly converging struts 9 that have the shape of a greatly flattened S and carry small perpendicular plates or shovels 10 which are all inclined to the horizontal and have bent over trailing corners 10a.

The lower dished plate or hub 8 is of regular uniform thickness and carries three blades 11 which extend outwardly. Each blade 11 has a leading cutting edge 12 that, relative to the rotor direction of rotation shown by arrow 21 extends forwardly inwardly, with an end edge 17 of the blade 11 inclined rearwardly inwardly and forming a slightly acute angle (0.5° to 30°) therewith. The blades 11 are all made of normal steel, or any hard alloy or metal, and all tilt upwardly backwardly as the plates 10. Preferably, however, the blades are composed of steel hard faced with, for example, carbides along the cutting edges.

Each blade 11 is formed at its outer edge with a substantially vertical or axial outer flange 13 and at its inner edge with a parallel thereto inner flange 13a; the latter has an inwardly directed lip 14 that is held to the plate 8 by bolts 15.

A flat vertical plate 20 does not rotate with the shaft 4, but is angularly fixed so that it serves to keep the center of the rotor 3 clear of earth.

As can be seen from FIGS. 1 and 4, the lower edge of both flanges 13 and 13a and the cutting edge 12 are lower than the edge 2a of the plowshare 2 by a distance $d$, according to principles laid out in the above-mentioned commonly assigned patent. The shaft 4 is here shown to be similarly tilted at an angle $a$ of some ½° to 3° to the vertical as is also set forth in that patent.

The blade tips define an orbit 19 having a diameter $D'$ which is smaller than the diameter $D''$ of the upper circular ring 7. This allows the entire rotor 3 to pass through the furrow made by the plowshare 2.

In operation, the soil freed by the plowshare 2 is thrown back against the rotor 3 whence it is comminuted and thrown to one side by the rotating tools 10. In this function the rotor 3 acts as the moldboard on a conventional plow. The blades 11 undercut the furrow formed by the plow 2 and throw the soil which is undercut upwardly into the path of the plates 10. The upwardly spiraling paths defined by these blades 11 and plates 10 quickly move the earth out of the furrow and to the side. Depending on the consistency of the soil, more or fewer blades 11 may be provided on the plate 8.

Should one plate 10 or blade 11 become damaged or worn it can simply be individually unbolted and replaced. No dismounting of the entire plow is necessary. What is more, the struts 9 are made of spring steel so that the plates 10 can be temporarily deflected without damaging the plow.

What is claimed is:

1. A rotary plow comprising:
   a support displaceable over the ground;
   a forwardly directed plowshare mounted on said support and adapted to undercut the ground surface and form a furrow; and
   a soil-working rotor rotatable in one sense on said support behind said plowshare in said furrow and formed as a downwardly tapered body of revolution with an upright axis and including
   a central axial shaft adapted to be driven in said one sense,
   a plurality of downwardly converging struts constituting the sides of said rotor,
   soil-working tools on said struts,
   a circular solid disk constituting the base of said rotor and attached to the end of said shaft with said struts being attached to said disk, and
   a plurality of radially extending angularly spaced blades removably mounted on said disk and projecting outwardly therefrom, each blade having in the direction of rotation a leading cutting edge inclined rearwardly with respect to said rotation sense, said blades each being inclined upwardly away from said rotation sense, all of said cutting edges being generally horizontal and lying in a common plane, each blade having relative to said axis an outer edge provided with a downwardly extending outer flange and an inner edge provided with an axially extending inner flange having a generally horizontal lip attached to said disk.

* * * * *